United States Patent [19]

Johnson

[11] 4,013,559
[45] Mar. 22, 1977

[54] PREFABRICATED PANELS FOR SUB-SURFACE SEWAGE EFFLUENT AND WASTE WATER DISPOSAL

[76] Inventor: Rollin W. Johnson, 215 Magnolia St., Statesville, N.C. 28677

[22] Filed: Nov. 19, 1975

[21] Appl. No.: 633,442

[52] U.S. Cl. .............................. 210/151; 210/170; 210/221 R; 210/532 S
[51] Int. Cl.² ................... B01D 21/24; C02C 5/04
[58] Field of Search .................. 61/10–13; 210/2, 16, 170, 262, 532 S, 150, 151, 221 R

[56] References Cited

UNITED STATES PATENTS

| 947,333 | 1/1910 | Hamilton | 210/16 |
|---|---|---|---|
| 1,155,970 | 10/1915 | Terry | 210/170 |
| 1,576,790 | 3/1926 | Roessner | 61/13 |
| 1,708,118 | 4/1929 | Carpenter et al. | 210/532 S |
| 2,674,337 | 4/1954 | Noe | 61/11 |
| 3,401,526 | 9/1968 | Rodgers | 61/11 X |
| 3,422,010 | 1/1969 | Case | 210/532 S X |
| 3,698,194 | 10/1972 | Flynn | 210/532 S X |
| 3,882,683 | 5/1975 | Purcell | 210/532 S X |
| 3,919,848 | 11/1975 | Sullivan | 210/170 X |
| 3,925,206 | 12/1975 | Dea | 210/170 X |

*Primary Examiner*—Charles N. Hart
*Assistant Examiner*—Robert H. Spitzer

[57] ABSTRACT

A prefabricated panel section formed of a strong, porous material and having a plurality of longitudinally extending, preferably vertically spaced chambers or compartments therein throughout the length of the section. A first pipe from a septic tank or preceding similar panel section has an outlet end opening directly into the uppermost chamber. A second pipe, conduit or other opening extends downwardly through the webs which separate the chambers to provide access to and egress from each compartment for air, chemicals, and effluent. In a preferred embodiment the top wall of the panel section or a portion is fabricated as a removable cover through which access to the system is gained. The panels may be grouped and connected together to form a complete ground absorption or percolation system.

16 Claims, 9 Drawing Figures

PREFABRICATED PANELS FOR SUB-SURFACE SEWAGE EFFLUENT AND WASTE WATER DISPOSAL

BACKGROUND OF THE INVENTION

Septic tanks are conventionally equipped with a tile field which receives sewage effluent from a septic tank in a subsurface ground system. The tile absorption field is generally a system of trenches in which are placed lengths of terra cotta or plastic drain pipes with openings in the walls through which the effluent escapes. The pipes are embedded in the bottom of the trenches, which are 30 -36 inches wide, and are covered and surrounded with stone about 10 inches deep and the width of the trench. The stone distributes the escaping effluent evenly to the side walls of the trench, where most of the absorption into the ground takes place.

This type of system has many disadvantages; a three bedroom home on a lot with marginal percolation rate of 60 minutes per inch of fall would require 300 lineal feet of trench and tile with the width of the trench being 3 feet wide. This 900 square foot trench bottom area generally provides storage for the effluent at peak water usage time, however rainwater may cause overloading of the absorption field, thereby causing it to back up into the home or surface on top of the ground. Many home sites (or lots) are not suited for this absorption field, due to topography of the land, size of lot, poor percolation or high water table.

Further the surface trench bottom in this type of absorption field will in time become covered over with a layer of undissolved sewage. When this happens most of the absorption takes place through the side walls of the trench. The undigested sewage will not adhere to the trench wall for long before it will sluff off, thereby keeping the trench walls relatively free of sewage particles. When the trench bottom area does become covered with sewage particles (sewage sludge) the home owner must retrench or replace the absorption field or add additional trenches to compensate for this loss in the absorption area. Additionally, roots may damage the line, or sediment may choke off flow of the effluent through the line, thereby deleteriously affecting the operation of the ground absorption system.

Some effort has been made to overcome some of these problems. For example, in U.S. Pat. No. 3,422,010 to Case a filter bed is formed of specially manufactured cement blocks arranged to provide a plurality of parallel sealed conduits which are connected by elbows to form a continuous pipe line. Such solutions as offered by the Case patent, as well as other attempts to solve the problems attendent to the tile field disposal system have generally been unsuccessful. They are still expensive to install and require much excavation, especially as regards the percentage of ground area to be excavated compared to the area of ground available. Additionally, such systems cannot be maintained or serviced by the home owner. In case of stoppage, the entire filter bed must be dug up and replaced.

Further, few of such systems, if any, achieve satisfactory aerobic bacterial action, as no adequate provision is made for the introduction of air into the complete underground system. An additional problem in hilly or mountainous areas arises in that prior systems require relatively long filter lines which must be installed on grade. This makes installation of such disposal systems almost impossible in mountainous area and very difficult in relatively hilly areas.

SUMMARY OF THE INVENTION

In the present invention the above-mentioned problems are overcome or minimized by the provision of a ground absorption system in which panel sections formed of concrete block or other strong, porous material replace the long pipe lines. The panel sections of the present invention, in one embodiment, are formed of a cement material embodied in a housing that is relatively long and deep, as well as being relatively narrow. Although the invention will, for the most part, be described hereinafter as formed of a cement or concrete material, it might be possible to use other strong, porous, lighter weight materials such as plastics, polymeric foams, or combinations of any of these with cement or concrete. such material should also be resistant to the acids in the sewage effluent.

Within the housing are a plurality of longitudinally extending, vertically spaced chambers separated by webs of cement material. A vertical opening extends through the webs to interconnect the chambers at one end thereof for the purpose of introducing air or chemicals to each of the chambers, while making it possible to withdraw effluent from the lower chambers. The top wall is in the form of a removable cover or includes an access opening to permit access to the interior of the panel for maintenance and inspection.

The panels are preferably approximately 10 feet in length, and formed preferably by securing together a plurality of conventional upstanding cement blocks arranged in a plurality of parallel, vertically spaced rows. The blocks in each row are secured together so that the conventional openings therethrough are aligned to form the aforementioned elongated chambers throughout the length of the panel. The panels may be offset in depth, one from the other, so that a system can be installed in hilly or mountainous terrain.

By such an arrangement, a large amount of effluent may be introduced into the soil, while a minimum of excavation and ground preparation is necessary. In this regard, as much effluent storage may be obtained with ten prefabricated panels, 10 feet long, 4 feet high, and 8 inches wide, as would be obtained by a conventional type drain field with a trench 300 feet long by 3 feet wide by 10 inches deep, filled with stone. Further, the aforementioned ten panels would provide eight times the trench wall absorption area as in the conventional type trench. The panel sections according to the present invention further provide an absorption field where the sewage effluent escapes through the side walls as it flows from top to bottom upon entering each panel. Further, any remaining dissolved solids are removed from the sewage effluent in the top chamber of the panel according to the present invention, wherein such solids are exposed to air to facilitate aerobic bacterial action.

The absorption field with panels according to the present invention may be installed much closer to the top of the ground, if turned horizontally, than is the case with conventional drain fields to take advantage of the top soil which has a much better absorption or percolation rate. Whereas the relatively wide trenches of the conventional method result in considerable settling of the ground across the top thereof, which further causes rainwater to overload the conventional drain field, the narrow trenches of the present invention eliminate such ground settling effect. The aeration of the sewage effluent within the panels and the filtration of the effluent as it passes through the panel walls and surrounding sand lowers the biological oxygen demand from the surrounding soil resulting in better absorption of the effluent into the ground.

The ground absorption system according to the present invention can be installed in areas having a relatively high water table that would normally affect conventional systems. This is effected by placing the panel horizontally at ground level with approximately 1 foot of washed creek sand beneath each panel, then rounding off the top of each panel with 6 inches to 1 foot of top soil. This will allow the homeowner to use light equipment such as riding lawnmowers and the like over the top of the absorption system, and eliminating soggy areas.

Additionally, and in conjunction with the invention, it is further proposed to modify existing septic tanks to restrict and contain most of the suspended particles of the sewage effluent therein by using a pair of confronting baffle walls.

As the panel is prefabricated, there is no construction and little assembly necessary on site, so that the installation is much quicker and easier than with other known systems and at a cost equal to or less than that of conventional systems.

Once installed, the system can be easily maintained and serviced by the homeowner, because the cover or access opening can be quickly removed for access to the upper chamber. Additionally, chemicals may be introduced to any of the lower compartments by means of a pipe or opening which extends down through the aforementioned webs into or through all of the lower chambers. Effluent may also be withdrawn, if desired, where the panel becomes overloaded. The aforementioned pipe between chambers also serves to continually introduce air into each of the lower compartments to induce aerobic bacterial action, as well as anaerobic action, resulting in more complete bacterial breakdown.

In the upper chamber, a layer of sand is provided in the bottom thereof to remove any solids which may remain in the effluent after leaving the septic tank, although generally, the large majority of the solids are separated and removed prior to introduction of the effluent to the ground absorption system.

If desired, one or more panels may be used to accept waste water which initially contains no solid matter directly from washing machines or showers, without necessitating the use of the septic tank. In such installations, the panels may be used as an additional ground absorption system to an existing conventional system to take care of overflow or where the existing system is inadequate. The system according to the present invention is also compatible with conventional, existing systems in that the panel sections may be attached to the end of existing systems to provide additional disposal of the sewage effluent and waste water.

It is therefore an object of the present invention to provide a new and improved type of ground absorption system for subsurface sewage effluent and waste water disposal which can be installed in a relatively small area compared to conventional systems.

It is further an object of the present invention to provide a ground absorption system of the type described which utilizes one or more prefabricated cement panel sections each of which includes a plurality of vertically spaced, longitudinally extending, waste water storage and disposal chambers.

It is further an object of the present invention to provide a ground absorption system which requires approximately 90 percent less excavation than is required in conventional systems.

Another object of the present invention is to provide a ground absorption system which can be easily maintained, inspected and serviced by the homeowner.

Yet another object of the present invention is to provide a ground absorption system in which both aerobic and anaerobic bacterial action occur to more completely break down solid matter.

Still another object of the present invention is to provide a ground absorption system which can be installed on lots having a slope in excess of thirty percent.

A further object of the present invention is to provide ground absorption panels that are compatible with and can be added to existing systems.

Other and further objects of the present invention will become apparent after reading the following detailed description of a preferred embodiment in view of the accompanying drawings in which:

DETAILED DESCRIPTION OF A PREFERRED EMBODIMENT

Figure 1:
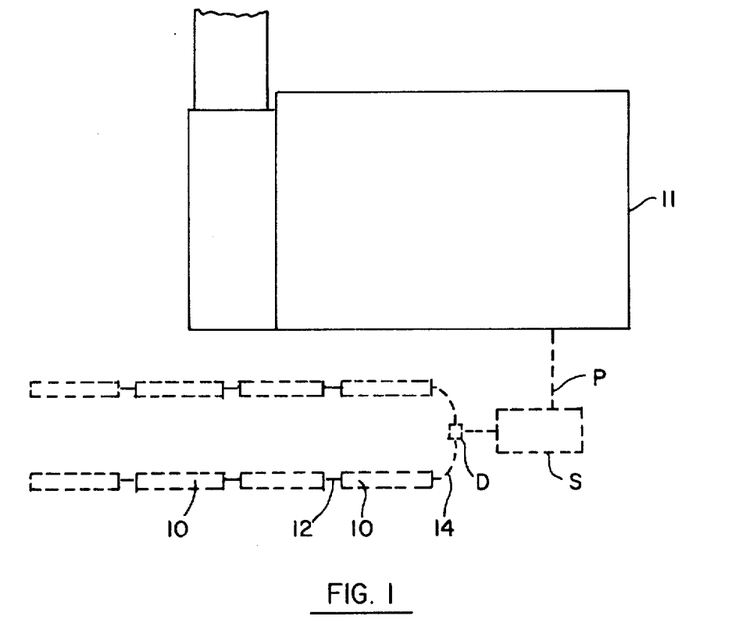
FIG. 1 is a schematic representation of a site layout utilizing prefabricated panels in a ground absorption system according to the present invention.

Turning now to a detailed description of the invention and looking first of all at FIG. 1, there is illustrated schematically a sewage and waste water disposal system. Sewage effluent and waste water are generated in some source 11 such as a house, home, commercial building or the like which is not connected to a city sewer system. The sewage and waste water is carried from the source 11 through a sewage pipe P into a septic tank S which may be of conventional design, or of modified form as will be described hereinafter. In the septic tank S, the vast majority of the solid waste is separated from the waste water or liquid effluent within the septic tank, so that, for the most part, only the fluid leaves the septic tank where it is dispersed through a distribution box D into conduits 14, carrying the waste water to branches of the absorption system. Each branch includes one or more panels 10 prefabricated in accordance with the present invention, and installed and connected by conduits 12. The prefabricated panels 10 according to the present invention can be placed in a trench or tenches, all on the same level, or they may be arranged in stepped or terraced arrangement if the terrain is hilly, with one row of panels being arranged on one level, and successive rows being arranged on a lower level as will be explained hereinafter.

Figure 2:
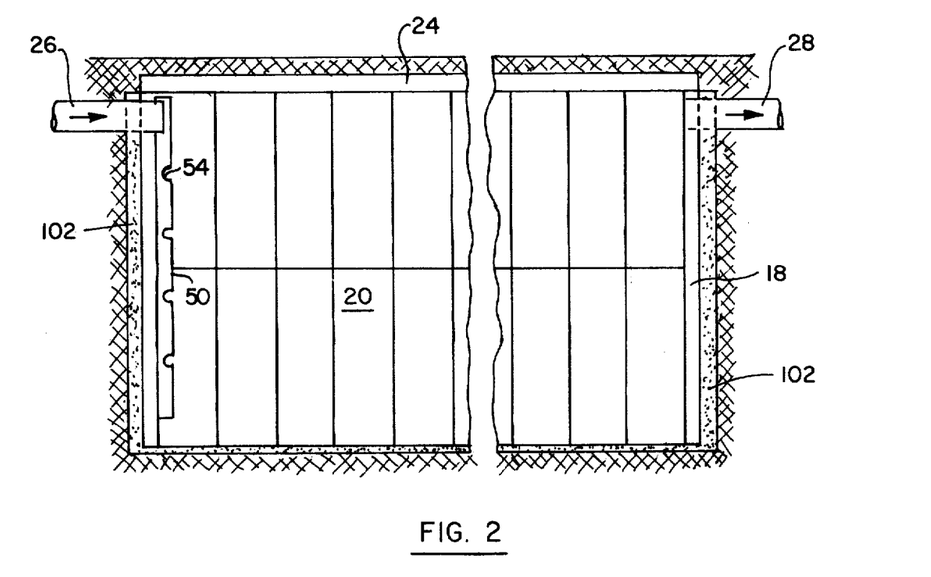
FIG. 2 is a side elevation of a single prefabricated panel installed in a trench of suitable size according to the present invention.
Figure 3:
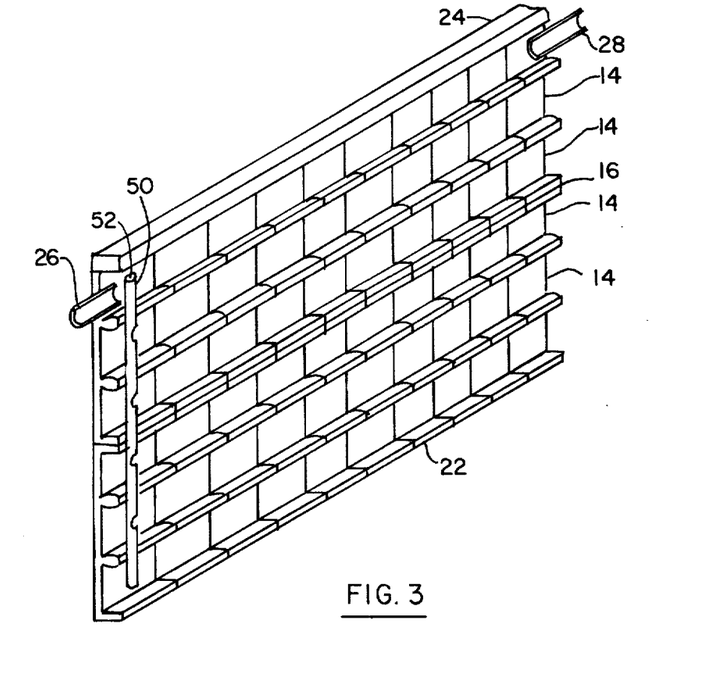
FIG. 3 is a perspective view, with the end walls and one side wall broken away, of the panel illustrated in FIG. 2, showing the arrangement of interior chambers therein.

As illustrated in FIGS. 2 and 3, each panel 10, in general, includes a plurality of longitudinally extending chambers or compartments 14 separated by a relatively thin cement web 16. The panel 10 itself, is formed of a cement material, or other suitable material described hereinabove, with closed end walls 18, side walls 20, a bottom wall 22, and a top wall 24. All or a portion of the top wall is removable or access is otherwise provided to the uppermost chamber. One of the end walls 18 includes an inlet 26 therethrough, and the other end wall is provided with an outlet 28. A communicating means 50 in the form of at least one pipe of conduit or other passageway extends through the separating webs 16 to interconnect the longitudinal chambers 14 for purposes to be hereinafter explained.

In the preferred embodiment, all, or a portion of cover 24 may be removed to provide access to the uppermost of chambers 14. Alternatively, but not preferably, a conduit or pipe may extend through an opening in cover 24 and into communication with the communicating means 50 to provide a means for introducing chemicals or water or air into selected chambers therebelow, or to remove effluent from any desired chamber therein. The walls and webs of panel 10 are preferably formed of a strong, porous material, and as illustrated in FIG. 2 a plurality of upstanding conventional cement blocks are joined together to form a panel of a desired size having interior chambers therein. The walls of the panel are preferably approximately 2 inches thick. Alternatively, as described hereinabove, it may be possible to form the panels of a porous plastic or combination of other materials that would provide a strong, porous, lightweight, panel resistant to acids in sewage effluent and which would facilitate installation.

Figure 4:
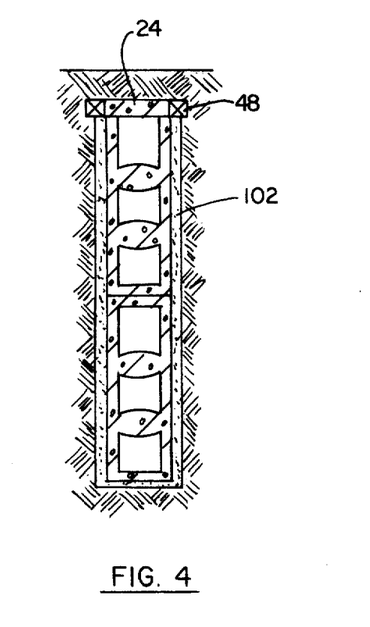
FIGS. 4 and 5 are transverse and longitudinal sectional views, respectively, with parts broken away, showing the interior of a prefabricated panel, installed, according to a preferred embodiment.
Figure 5:
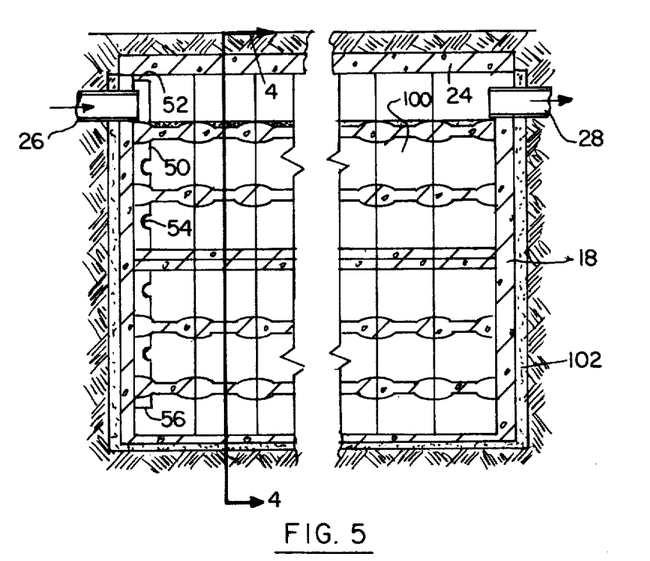

In a first embodiment, a panel 10 is prefabricated in accordance with the present invention as illustrated in FIGS. 4 and 5, and includes basically three longitudinal rows of upstanding cement blocks positioned face to face in the manner illustrated in FIGS. 2 and 3. Each block is united with the adjacent block in the same row by some type of conventional, commercially available adhesive mortar or glue. Further, each row of blocks is similarly joined to the row immediately above or below. Preferably, the adhesive is applied only at the corners and at spots along the juxtaposed edges, so that a crack is formed between adjacent cement blocks which facilitates seepage of the effluent therethrough. Of course water will also flow readily through the porous cement walls.

Each cement block is of the type conventionally manufactured for and used in building construction and includes a pair of openings therethrough. In the arrangement shown herein, the blocks are arranged in upstanding fashion with the openings through one block communicating with the openings through the adjacent block to form a continuous elongated chamber 14 as illustrated in FIG. 3.

In the embodiment illustrated in FIGS. 4 and 5, the top wall or cover 24 is either partially or completely removable. Toward this end, a row of bricks 48 is arranged just outside the upper edge of either surface of side walls 20 atop fill sand 102. The removable cover 24 fits down between the rows of bricks 48 and rests atop the upper edge of side walls 20. Due to the weight of cover 24, it is preferably fabricated in a plurality of sections, so that one or more sections may be removed individually to perform maintainence or inspection operations.

At least one relatively large pipe or conduit 50 (approximately 4 inches in diameter) extends downwardly from the uppermost chamber through each of webs 16 and all of the intermediate chambers, into the lowermost chamber. Pipe 50 includes an open top 52 positioned approximately 1½ inches from the top wall of the uppermost chamber, a plurality of openings in the wall of the pipe in each intermediate chamber approximately 1½ inches down from the top wall thereof, and an open bottom end terminating approximately 1½ inches below the lower surface of the web above the lowermost chamber. The open top 52 of pipe 50 and the openings 54 in the side wall of pipe 50 in each chamber provide an outlet for effluent and waste water after it reaches a prescribed depth in each chamber. Open top 52, openings 54, open lower end 56 also transform pipe 50 into a conduit for air which enters inlet 26, and may be introduced into each chamber tp provide the aforementioned aerobic bacterial action. Further, when the cover 24 is removed, a hose may be inserted in the open top 52 of pipe 50 to introduce chemicals, water, air, or other desired treating agent into any desired chamber. Effluent may also be removed from each chamber when the open top 52 is connected to a vacuum source (not shown).

The pipe 50 is preferably affixed by glue or adhesive to end wall 18 or side wall 20 at any desired location conveniently near the inlet 26.

An inlet pipe 26 brings effluent from the septic tank S and enters panel section 10 through the upper portion of one of end walls 18 into the uppermost chamber. Along with the waste water and effluent, air from the septic tank S is brought into panel section 10, and circulates down into each of the chambers through the clearance openings 54. This allows aerobic as well as anaerobic bacterial breakdown to occur within all chambers of the panel, which is not customary in known ground absorption systems. Further, as illustrated in FIG. 5, an outlet 28 extends through the opposite end wall 18 from inlet 26, and carries waste water and effluent onto the next successive panel system 10 to distribute the waste water throughout the panel distribution system.

Figure 6:
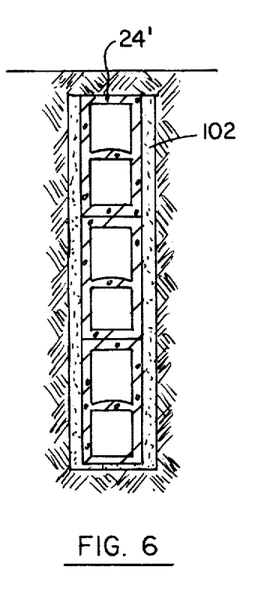
FIGS. 6 and 7 are transverse and longitudinal sectional views of the interior of a prefabricated panel, similar to FIGS. 4 and 5, except showing an alternate embodiment.
Figure 7:
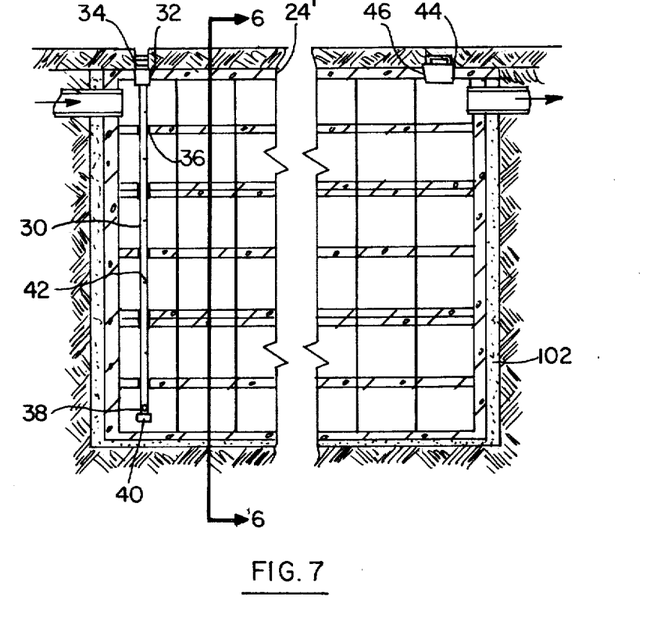

In an alternate embodiment illustrated in FIGS. 6 and 7, the panel section 10 is much the same as that illustrated in FIGS. 4 and 5, except for two differences. First of all, the cover 24' of the embodiment illustrated in FIGS. 6 and 7 is not removable. Rather, cover 24' is the end wall of the uppermost row or blocks. Further, a second distinction is that a rigid conduit or pipe 30 of approximately 1 inch in diameter extends through an opening 32 in the upper wall 24'. A sleeve 34 is positioned within opening 32 and receives pipe 30 which further extends through corresponding openings 36 in each of the webs 16 separating the elongated chambers. The openings 36 are of such size that the pipe can be freely moved up and down within the panel 10 to position the outlet or opening 38 at the lowermost portion of the pipe in any desired chamber 14. The lower end of pipe 30 is closed with an end cap 40, and a mark 42 corresponding to each chamber is positioned on the pipe, so that as a workman pulls the pipe upwardly from the panel, he can determine in which chamber the outlet 38 is positioned. By manipulating the pipe up and down, so that outlet 38 is in a desired chamber, purging chemicals, water, air or any other desired treating agent can be introduced through the pipe into a desired chamber. Further, by attaching the upper end of pipe 30 to a vacuum pump (not shown), effluent may be removed from below.

In cases where the top wall 24' is for the most part solid, as in the embodiment illustrated in FIGS. 6 and 7, a removable access plug 44 is inserted within a suitable opening 46 in top wall 24, whereby the owner can remove the plug and inspect or maintain the upper chamber therein below. The upper chamber is both of the aforementioned embodiments preferably includes a layer of filter sand 100, having a particle size of 0.35 to 0.50 mm., on the web 16 which separates the uppermost chamber from the chamber immediately therebelow. The sand acts to filter out any solid materials that might possibly remain in the waste water arriving from the septic tank. Periodically then, where possible, the sand in the uppermost chamber should be replaced to maintain optimum operation. It should be kept in mind that in the embodiment shown in FIGS. 6 and 7, the maintainence of the lower chambers is carried out only by the introduction of chemicals or air, or the removal of sewage water through pipe or hose 30.

To install panels 10, some trenching is required, however much less than is necessary with previous systems. For example, a trench approximately 12 inches wide and slightly greater than 4 feet deep is dug. A thin layer of creek sand or even the filter type sand described hereinabove is spread along the bottom of the trench, and panels 10 are inserted in the trench and supported by approximately 2 inches of creek sand, or filter sand as described above on either side thereof. Panel sections 10 are then connected to the septic tank S or distribution box D by means of the connecting conduits 14. After the covers are installed, a narrow or shallow cover of top soil is applied to hide the panel.

It should be noted that, where the terrain is hilly, successive rows of panels are installed in a stepped down relationship. In such cases the outlet or outflow pipe 28 from the end of one particular row extends outwardly from the last panel section and down into the uppermost chamber of the first panel section 10 in the next or succeeding row.

In operation, as effluent or waste water leaves the septic tank S it flows into the uppermost chamber of any of the prefabricated panel sections 10. The porous material from which the panel section is formed allows some of the waste water to seep downwardly into the intermediate chambers and finally into the lowermost chambers, as well as simultaneously seeping outwardly through the side walls into the surrounding soil. The cracks between adjoining cement blocks will also enable effluent to seep outwardly from the disposal panel. Simultaneously, the outlet pipe 28 will carry excess additional effluent to the next or succeeding panel. As the effluent level in the upper chamber rises above the inlet and outlet pipes 26,28, it will eventually overflow through pipe 50 or the other types of communicating means provided down into the lower chambers. Thus effluent is distributed throughout the entire system, enabling a large amount of waste water or effluent to be handled within a relatively short disposal system.

Figure 8:
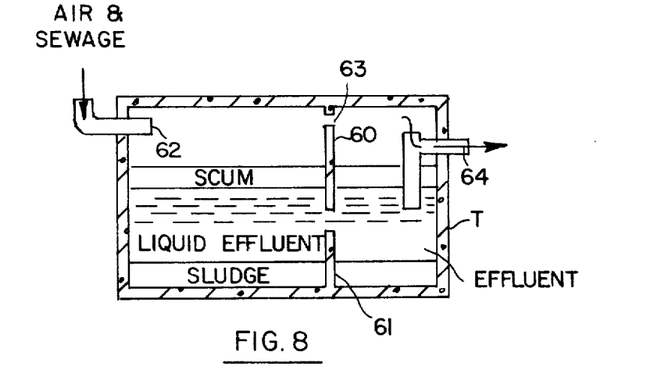
FIG. 8 is a sectional view of a septic tank particularly adapted for use with panel sections of the present invention.

As mentioned hereinabove, the septic tank used with the system might be of the conventional type which includes an outlet pipe leaving the septic tank and having an entrance end extending down to the lower part of the septic tank below the skum line wherein only waste water is collected. Alternatively, as illustrated in FIG. 8, a specially designed septic tank T is peculiarly adapted for the aforedescribed system and includes a pair of baffle walls 60,61 between the inlet 62 and the exit 64. An opening 63 in the upper baffle 60 permits air entering the septic tank T along with sewage through inlet 62 to pass to the other side of baffle wall 60. At the exit end, contrary to conventional inverted L-shaped outlets, the outlet pipe 64 according to the present invention includes a T-shaped conduit with both ends of the cross-bar being open. One end of the T is in communication with the air above the skum line, while the other end of the cross portion of the T extends downwardly into the watery portion of the septic tank below the skum line. So arranged, the baffle helps to separate the solid portion of the sewage and waste water and, for the most part, insures that only waste water enters the outlet 64 through the lower arm, while the upper arm of the T permits air to enter the disposal system as described hereinabove, it being further a part of the present invention to conduct the air entering the septic tank into the disposal system itself, which has not heretofore been done.

Figure 9:
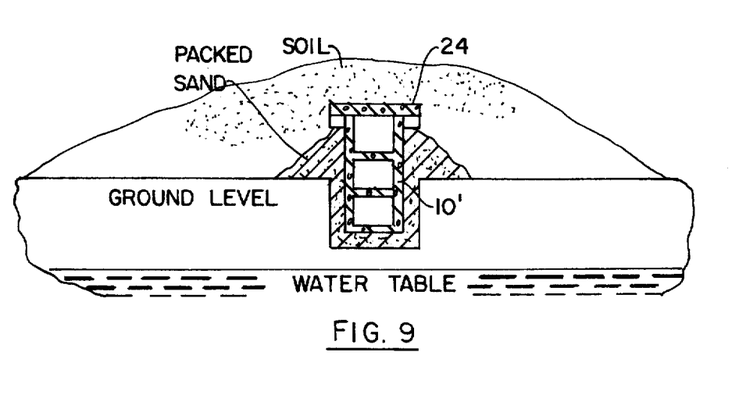
FIG. 9 is a transverse sectional view of an installed panel for areas with a high water table.

In certain locations, such as those with high water tables, it is not possible to dig a trench 4 feet deep above the water table. It is envisioned that a modification 10' of the aforedescribed panel sections, as illustrated in FIG. 9, will obtain quite satisfactory results. Basically, the panel section 10' is formed having a height of only half that of the preferred embodiment. Where cement blocks are being used, one row of blocks, with each block being approximately 2 feet in length, is formed into a smaller panel, as in the manner described for the embodiment of FIGS. 2–5. A 12 inch trench is dug, the bottom covered with sand, and the panel section 10' emplaced with approximately half of the height thereof being exposed above the ground. Sand is filled in around the panel section 10' as heretofore described and back-filled against the exposed side walls. A mound of top soil is then used to cover the upper exposed portion of the panel, providing a gentle rise and fall around the absorption system whereby lawn mowers and tractors may be driven thereacross without damage to the panel sections underneath.

Alternatively to the embodiment shown in FIG. 9, a full-size prefabricated panel could be installed in a horizontal orientation, rather than vertically as explained hereinabove. The same action would occur, except that the waste water would enter a longitudinally extending chamber at one end of the panel and then move horizontally through the webs separating the chambers until all chambers were filled. The waste water would still seep through the porous side walls which would be oriented horizontally rather than vertically as hereinabove. Further, in cases where the prefabricated panels 10 were installed horizontally, the entire large side wall which forms the top should be covered with straw for aeration and evaporation through the soil.

Although only one pipe 50 communicating between all channels is illustrated, it should be noted that a second similar pipe 50 might be installed at the opposite end of panel 10, so that a draft through each channel would be created. Further, a mechanical ventilating fan positioned within a vent stack on the building served by the disposal system could be connected into the disposal system through sewage pipe P to provided forced ventilation therein. In such a case, an exhaust outlet or vent should be provided for the last panel section in each row of panels to insure a draft completely through the system.

It is apparent that further modifications and alternations could be made to the prefabricated panel disposal system according to the present invention, which is to be limited only by the following claims.

What is claimed is:

1. A ground absorption system for sub-surface sewage effluent and waste water disposal from septic tanks comprising a relatively narrow trench substantially twelve inches wide, at least one panel section formed of a strong, but porous material and positioned in said trench, said panel section having at least three elongated chambers arranged one above the other therein, a pipe having an inlet end in said septic tank and an outlet end in the uppermost of said chambers for delivering water and air from said septic tank directly into the uppermost chamber of the first of said panel sections, communicating means extending vertically down through said panel section and connecting said elongated chambers through which air and overflow waste water from said uppermost chamber may be delivered to each of the lower chambers, a thin layer of sand approximately two inches thick filling the space between the outer walls of said panel section and the walls of said trench, whereby effective dispersal of effluent from the septic is obtained with a minimum of trenching and no gravel necessary, and in which the solids which are received with the waste water are subjected to aerobic breakdown throughout said panel section.

2. A ground absorption system for disposing of sub-surface sewage effluent and waste water emitted from septic tanks which receives effluent from a source in a conventional manner comprising:
 a. at least one panel section, including:
  i. a top wall, bottom wall, end walls, and side walls and formed of a strong, porous cementitious material;
  ii. a plurality of elongated chambers including an uppermost, lowermost, and at least one intermediate chamber arranged one above the other within said section, each of said chambers being at least partially separated from the adjacent chamber by a web of said porous cementitious material;
 b. a pipe extending from said septic tank directly into the uppermost of said plurality of elongated chambers through which air, along with waste water, is delivered from said septic tank to said panel section;
 c. said pipe having a divided inlet end in said septic tank including a first opening above the effluent and a second opening below the effluent level, whereby both air and effluent enter said pipe; and
 d. communicating means extending through said webs for delivering air and overflow waste water to the intermediate and lower of said chambers throughout said panel section.

3. The ground absorption system according to claim 2 wherein said top wall includes a means for providing access to the uppermost of said chambers.

4. The ground absorption system according to claim 2 wherein said communicating means for introducing said selected materials to each of said chambers includes at least one hollow pipe attached to one of the walls of said panel section and extending from the uppermost chamber to the lowermost chamber through openings in each of said webs, the upper end of said pipe being open in the uppermost chamber and the lower end of said pipe being open and in communication with the lowermost of said chambers, and an opening extending through the wall of said pipe in each of said intermediate chambers, whereby selected materials may be introduced or withdrawn from the uppermost, lowermost and each of said intermediate chambers.

5. The ground absorption system according to claim 4 wherein said open upper and lower ends of said pipe and each of said openings in the side walls thereof are at a point in each chamber adjacent the upper wall of the corresponding chamber, whereby the openings are normally above the liquid level in each chamber and permit the passage of air entering the panel section from said inlet pipe to be carried by said pipe downwardly into each of said intermediate and lower chambers to the lower chambers.

6. The ground absorption system according to claim 2 wherein said conduit means for introducing selected materials to each chamber includes at least one rigid tube with an upper end extending through said cover and the major portion thereof extending through corresponding openings in each of said webs, said tube having an open upper end and an opening adjacent said lower end, and being movable in a vertical direction, whereby said opening adjacent said lower end may be selectively positioned within any one of said chambers.

7. The ground absorption system according to claim 2 wherein said uppermost chamber further includes a layer of sand therein for separating any solid waste material from the waste water before allowing the waste water to seep downwardly into the chambers below.

8. The ground absorption system according to claim 2 wherein a plurality of said panel sections are connected in tandum and wherein successive rows of panels are offset below preceding panels, each of said offset panels having an inlet in one end of the uppermost chamber and an outlet from the opposite end of one of the elongated chambers.

9. The ground absorption system according to claim 2 wherein said panel sections comprise a plurality of rows of upstanding cement blocks with the blocks in each row being arranged face to face to form a plurality of continuous passageways therethrough, and the rows being arranged one above the other, and said end wall attached to opposite ends of said panel sections to enclose the ends thereof.

10. The ground absorption system according to claim 2 and further including a septic tank having air passage means associated therewith for receiving air along with sewage and for transmitting some of said air on to said panel sections.

11. The ground absorption system according to claim 10 wherein said air passage means including an outlet having a first opening therein for transferring effluent to said panel sections and a second opening therein for receiving air from the upper portion of said septic tank and introducing said air into said panel sections.

12. A prefabricated panel for receiving sewage effluent and waste water from a septic tank in a ground disposal circulation system comprising an elongated narrow housing formed of a porous cement material and having top and bottom walls, end walls, and side walls, a plurality of vertically spaced, cement, separator webs extending between the side walls along the length of said housing to form an upper, lower, and at least one intermediate elongated chamber; an inlet through one of said end walls into said upper chamber through which a pipe from said septic tank extends whereby said effluent and waste water is introduced into the housing; and a communicating means extending through said webs and interconnecting said chambers for introducing air, effluent and selected other materials into any of said intermediate or lower chambers.

13. The prefabricated panel according to claim 12 wherein said conduit means for introducing said selected materials to each of said chambers includes at least one hollow pipe attached to one of the walls of said panel sections and extending from the uppermost chamber to the lowermost chamber through openings in each of said webs, the upper end of said pipe being open in the uppermost chamber and the lower end of said pipe being open and in communication with the lowermost of said chambers, and an opening extending through the wall of said pipe in each of said intermediate chambers, whereby selected materials may be introduced or withdrawn from the uppermost, lowermost and each of said intermediate chambers.

14. The prefabricated panel according to claim 13 wherein said open upper and lower ends of said pipe and each of said openings in the side walls thereof are at a point in each chamber adjacent the upper wall of the corresponding chamber, whereby the openings are normally above the liquid level in each chamber and permit the passage of air entering the panel section from said inlet pipe to be carried by said pipe downwardly into each of said intermediate and lower chambers, however provide an overflow outlet from one of said chambers to the lower chambers.

15. The prefabricated panel according to claim 12 wherein said conduit means for introducing selected materials to each chamber includes at least one rigid tube with an upper end extending through said cover and the major portion thereof extending through corresponding openings in each of said webs, said tube having an open upper end and an opening adjacent said lower end, and being movable in a vertical direction, whereby said opening adjacent said lower end may be selectively positioned within any one of said chambers.

16. The prefabricated panel according to claim 12 wherein said panel sections comprise a plurality of rows of upstanding cement blocks with the blocks in each row being arranged face to face to form a plurality of continuous passageways therethrough, and the rows being arranged one above the other, and an end wall attached to opposite ends of said panel sections to enclose the ends thereof.

* * * * *